US008848628B2

(12) United States Patent
Ko et al.

(10) Patent No.: US 8,848,628 B2
(45) Date of Patent: Sep. 30, 2014

(54) USER EQUIPMENT SCHEDULING METHOD IN CELLULAR UPLINK COMMUNICATION SYSTEM AND BASE STATION APPARATUS THEREFOR

(75) Inventors: Jae-Yun Ko, Suwon-si (KR); Sung-Ho Lee, Seoul (KR); Soon-Young Yoon, Seoul (KR); June Moon, Seoul (KR); Chung-Ryul Chang, Yongin-si (KR); Sung-Woo Park, Suwon-si (KR); Seung-Won Kang, Suwon-si (KR); Ho-Joong Kwon, Ansan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 237 days.

(21) Appl. No.: 12/927,236

(22) Filed: Nov. 10, 2010

(65) Prior Publication Data
US 2011/0188388 A1 Aug. 4, 2011

(30) Foreign Application Priority Data

Jan. 29, 2010 (KR) ........................ 10-2010-0008743

(51) Int. Cl.
*H04W 4/00* (2009.01)
(52) U.S. Cl.
USPC ......... 370/329; 370/328; 370/437; 455/452.1
(58) Field of Classification Search
None
See application file for complete search history.

(56) References Cited

U.S. PATENT DOCUMENTS

| | | | |
|---|---|---|---|
| 8,023,459 B2 * | 9/2011 | Kang et al. | 370/329 |
| 2002/0058513 A1 * | 5/2002 | Klein et al. | 455/447 |
| 2005/0096062 A1 * | 5/2005 | Ji et al. | 455/450 |
| 2006/0094363 A1 * | 5/2006 | Kang et al. | 455/63.1 |
| 2007/0189199 A1 | 8/2007 | Nishio | |
| 2007/0293260 A1 | 12/2007 | Xiao et al. | |
| 2008/0108363 A1 * | 5/2008 | Yu et al. | 455/450 |
| 2008/0240072 A1 * | 10/2008 | Bykovnikov | 370/350 |
| 2009/0239540 A1 | 9/2009 | Yoneta | |
| 2010/0159972 A1 * | 6/2010 | Cho et al. | 455/501 |
| 2011/0045831 A1 * | 2/2011 | Chiu et al. | 455/436 |

FOREIGN PATENT DOCUMENTS

EP 1 895 795 A2 3/2008

OTHER PUBLICATIONS

International Search Report dated Aug. 1, 2011 in connection with International Patent Application No. PCT/KR2010/007851.

* cited by examiner

*Primary Examiner* — Donald Mills (57) ABSTRACT

A method and an apparatus maximize the capacity of a wireless communication network by taking into consideration inter-cell interference coordination. A home cell's capacity sensitivity to interference is calculated. At least one neighbor cell's capacity sensitivity to interference is collected. And at least one UE located in the home cell is scheduled based on the home cell's capacity sensitivity and the neighbor cell's capacity sensitivity. Accordingly, it is possible to achieve power and allocation control to maximize the capacity of the overall network including neighbor cells increase the system capacity in a cellular system in which inter-cell interference is large, and adaptively perform a UE scheduling in real time to changing distribution of UEs because information on a change in the capacity of each cell is shared by periods.

22 Claims, 3 Drawing Sheets

USER EQUIPMENT SCHEDULING METHOD IN CELLULAR UPLINK COMMUNICATION SYSTEM AND BASE STATION APPARATUS THEREFOR

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jan. 29, 2010 and assigned Serial No. 10-2010-0008743, the entire disclosure of which is hereby incorporated by reference.

TECHNICAL FIELD OF THE INVENTION

The present invention relates to a scheduling method and an apparatus in a cellular uplink communication system based on Orthogonal Frequency Division Multiplexing (OFDM) technology and, more particularly to a scheduling method and a base station apparatus that take inter-cell interference coordination into consideration.

BACKGROUND OF THE INVENTION

In a Code Division Multiple Access (CDMA) system and an Orthogonal Frequency Division Multiplexing (OFDM) system, a scheme employing a frequency reuse rate of 1, in which all cells use the same frequency band, is used to increase the capacity of a cellular communication system. When all cells use the same frequency, there is a problem in that inter-cell interference causes the capacity of a cell boundary area to decrease.

Figure 1:
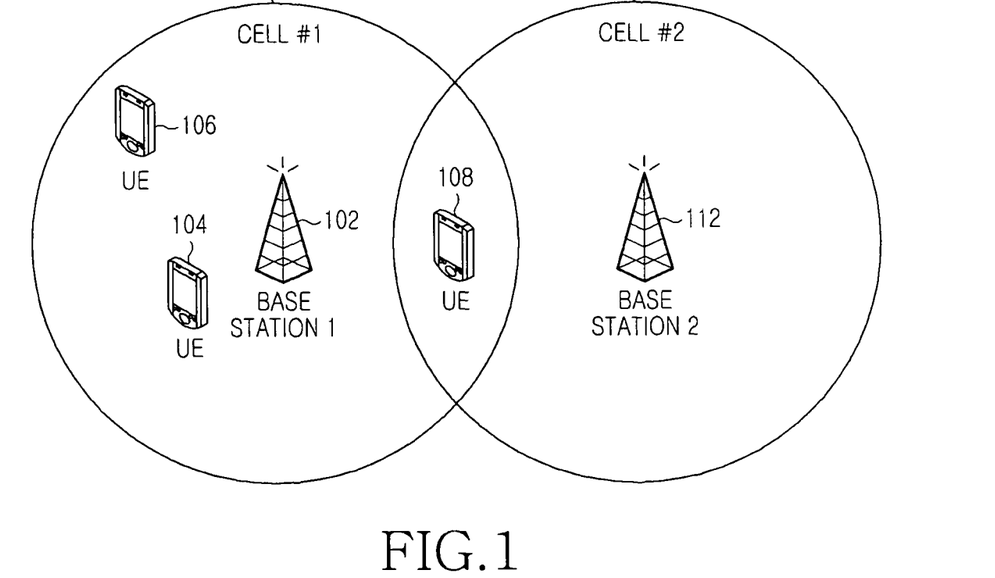
FIG. 1 illustrates a cellular communication system including two cells.

FIG. 1 illustrates a cellular communication system.

Two base stations 102 and 112 are located in two cells 100 and 110, respectively, and a plurality of user equipments (UEs) 104, 106, and 108 are distributed in the cells 100 and 110.

In order to solve the problem, the fractional frequency reuse (FFR) technology that allows the UEs 106 and 108 located in a cell boundary area to use a frequency reuse rate of 3, and allows the UE 104 located in the center area of the cell to use a frequency reuse rate of 1, has been proposed.

Attempts have been continuously made, even in a Mobile-WiMAX system, to increase the capacity of a UE located in a cell boundary area by applying the FFR technology.

When the FFR technology is applied, a frequency pattern suitable for each cell is determined by a cell planning tool (or an equivalent) at the time when a base station is built, and the determined pattern is used fixedly (i.e. without a change). However, in an actual environment, distribution of users (i.e. UEs) shows different characteristics depending on cells. That is, while the distribution of UEs in a cell is concentrated on a cell boundary, the distribution of UEs in another cell is concentrated on the center of the cell. Also, such a distribution of UEs may vary as time passes.

In order to efficiently use resources, it is necessary for an FFR frequency pattern to vary depending on the changing UE distribution. However, since the conventional FFR technology uses a fixed frequency pattern, it is impossible to accurately reflect the characteristics of the changing UE distribution. Specifically, a non-uniform UE distribution environment reduces the efficiency of resource usage.

Recently, in a 3rd Generation Partnership Project (3GPP) Long Term Evolution (LTE) system, an attempt has been made to reflect a dynamic cell characteristic therein by exchanging load information of cells through the use of an X2 interface between base stations. However, since the amount of exchanged information is limited, there is a limitation in efficiently controlling inter-cell interference with the limited information.

SUMMARY OF THE INVENTION

To address the above-discussed deficiencies of the prior art, it is a primary object to provide a user equipment (UE) scheduling method and apparatus for maximizing the capacity of the overall network including neighbor cells.

Also, the present invention provides a method and apparatus for sharing information for inter-cell interference coordination, and deriving UE's power and allocation control to maximize the capacity of a network based on the shared information.

In addition, the present invention provides a scheduling method and an apparatus for being adaptive in real time to distribution of UEs included in a cell.

In addition, the present invention provides a UE scheduling method and apparatus for preventing an increase of an overhead caused by transmission of the information to maximize the capacity of the overall network.

In accordance with an aspect of the present invention, there is provided a user equipment (UE) scheduling method by a base station in a cellular uplink communication system, including calculating a home cell's capacity sensitivity to interference. At least one neighbor cell's capacity sensitivity to interference is collected. And at least one UE located in the home cell is scheduled through use of the home cell's capacity sensitivity and the neighbor cell's capacity sensitivity.

In accordance with another aspect of the present invention, there is provided a base station apparatus for scheduling a user equipment (UE) in a cellular uplink communication system. The base station apparatus includes a capacity sensitivity calculation unit for calculating a home cell's capacity sensitivity to interference. A transmission/reception unit collects at least one neighbor cell's capacity sensitivity to interference. And a scheduling unit schedules at least one UE located in the home cell through use of the calculated home cell's capacity sensitivity and the collected neighbor cell's capacity sensitivity.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 2:
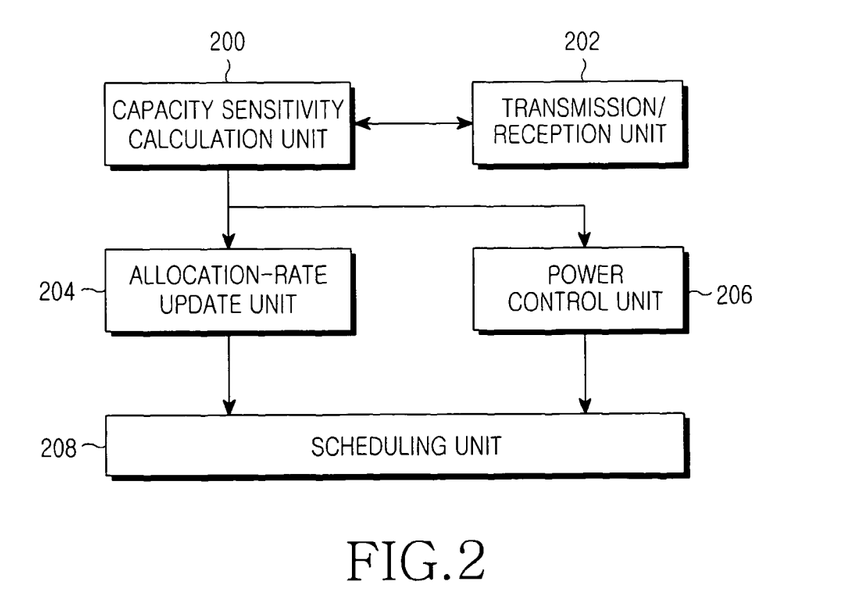
FIG. 2 illustrates a base station apparatus according to an embodiment of the present invention.
Figure 3:
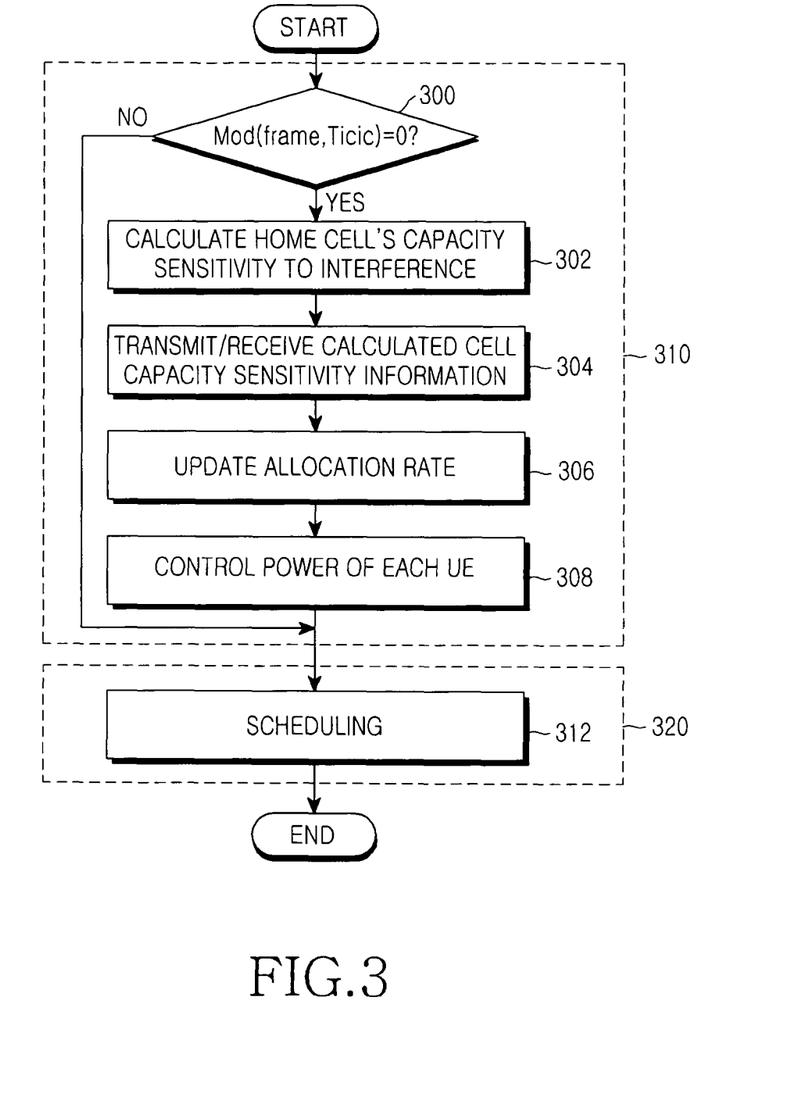
FIG. 3 illustrates a scheduling process of the base station apparatus according to an embodiment of the present invention.
Figure 4:
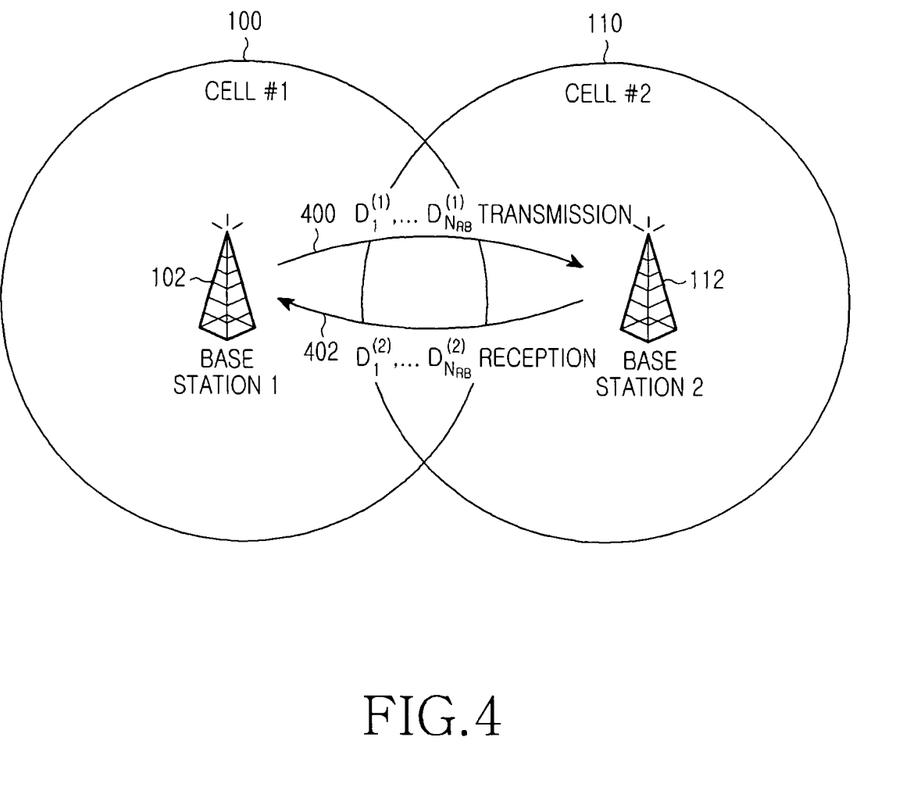
FIG. 4 illustrates information exchange between cells for Inter-Cell Interference Coordination (ICIC) when there is one neighbor cell according to an embodiment of the present invention.

FIGS. 2 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

In the following description of the present invention, a detailed description of known functions and configurations incorporated herein will be omitted when it may make the subject matter of the present invention rather unclear. Terms described in the following description are defined by taking functions thereof into consideration, so they may vary according to users, operator's intention, or custom. Accordingly, the terms are defined based on the entire contents of the present application.

According to the present invention, inter-cell interference coordination (ICIC) is achieved using information of a neighbor cell as well as information of a home cell. That is, according to an embodiment of the present invention, a scheduling method performed by a base station apparatus includes calculating, by each cell, information for interference coordination and notifying neighbor cells of the calculated information. In addition, according to an embodiment of the present invention, a scheduling method performed by a base station apparatus includes controlling resource allocation and transmission power of a user equipment (UE), through the use of its own cell information and information which is required for interference coordination and received from at least one neighbor cell.

FIG. 2 illustrates of a base station apparatus according to an embodiment of the present invention.

According to an embodiment of the present invention, a base station apparatus includes a capacity sensitivity calculation unit 200, a transmission/reception unit 202, an allocation-rate update unit 204, a power control unit 206, and a scheduling unit 208.

The capacity sensitivity calculation unit 200, transmission/reception unit 202, allocation-rate update unit 204, and power control unit 206 perform the operations thereof in a period of time for inter-cell interference coordination (Ticic) in a long term. And the scheduling unit 208 performs the operation thereof every frame period in a short term.

The capacity sensitivity calculation unit 200 calculates its own capacity sensitivity—that is, a capacity change rate to a unit interference of its own cell (i.e. home cell).

The transmission/reception unit 202 transmits information on the calculated capacity sensitivity to at least one neighbor cell (e.g. a base station of a neighbor cell) and receives information on capacity sensitivity of the at least one neighbor cell, which has been transmitted from the neighbor cell. Because information exchange by the transmission/reception unit 202 is performed not every frame but in a Ticic period (e.g. in a period of 100 msec)—that is, in a long term—the amount of information generated by the inter-cell information exchange is not large, and the increase of a system overhead is slight.

The allocation-rate update unit 204 calculates a resource allocation rate of a UE so as to maximize an increase of a network capacity, through the use of information on the capacity sensitivity of the home cell, which has been calculated by the capacity sensitivity calculation unit 200, and/or information on the capacity sensitivity of the at least one neighbor cell, which has been received by the transmission/reception unit 202.

The power control unit 206 controls uplink transmission power of the UE to increase/decrease so as to maximize an increase of a network capacity, through the use of information on the capacity sensitivity of the home cell, which has been calculated by the capacity sensitivity calculation unit 200, and/or information on the capacity sensitivity of the at least one neighbor cell, which has been received by the transmission/reception unit 202.

The scheduling unit 208 performs a scheduling operation at every frame, through the use of the calculated allocation rate of the UE and the controlled transmission power.

Optionally, the base station apparatus further includes a controller for controlling the operations of the components thereof, operating a timer, or determining if a specified condition is satisfied.

It should be noted that the components of the base station apparatus illustrated in FIG. 2 are not intended to limit the scope of the present invention. That is, the components 200 to 208 illustrate components operating in the base station apparatus according to one embodiment, and the present invention is not limited such that all the components must be included in order to implement the present invention, or such that that each function of a specific component must be independently operated.

The scheduling operation of the base station apparatus will now be described.

FIG. 3 illustrates a scheduling process of the base station apparatus according to an embodiment of the present invention.

In block 300, the base station apparatus determines whether the current frame corresponds to a Ticic period before performing a scheduling process which is performed every frame. Whether or not the current frame corresponds to the Ticic period may be determined by whether the frame modulo Ticic (mod(frame, Ticic)) has a value of zero. Here, "frame" represents the number of the current frame.

When the mod(frame, Ticic) has a value of zero (i.e. when the number of the current frame is a multiple of Ticic), the base station apparatus performs blocks 302, 304, 306, and 308 of calculating a resource allocation rate and transmission power through the use of information on capacity sensitivity according to each cell before performing a UE scheduling.

In FIG. 3, a process indicated by reference numeral 310 represents a process which is performed every Ticic period, and includes blocks 300 to 308.

In block 302, the capacity sensitivity calculation unit 200 calculates a capacity sensitivity of its own cell (i.e. home cell) according to an increase in interference noise. In order to calculate a resource allocation rate and to control transmission power, it is necessary to estimate capacity decrease of a neighbor cell due to interference caused by the home cell, and it is necessary to be aware of capacity decrease of its own cell (i.e. home cell) due to interference caused by a neighbor cell.

To this end, in block 304, the transmission/reception unit 202 transmits information on capacity sensitivity of its own cell (i.e. home cell) calculated by the capacity sensitivity calculation unit 200 to a neighbor cell, and receives information on capacity sensitivity of each neighbor cell according to an interference noise increase, caused from the home cell, from each neighbor cell. The received information on capacity sensitivity of each neighbor cell is transferred to the capacity sensitivity calculation unit 200. Because the exchange (transmission/reception) of information on capacity sensitivity between the home cell and each neighbor cell is generated not every frame, but in a Ticic period (e.g. in a period of 100 msec), the amount of information generated by the inter-cell information exchange is not large, and an overhead thereby is also slight.

In block 306, the allocation-rate update unit 204 updates the resource allocation rate of the UE through the use of the capacity sensitivities of the home cell and neighbor cell. Here, the allocation rate represents an allocation rate of a resource for one UE, and has a value between 0 and 1. In contrast from the resource allocation scheme that only pursues maximization of the capacity of the home cell, an embodiment of the present invention considers both an increase in the capacity of the home cell and a decrease in the capacity of a neighbor cell, which is caused by the increase in the capacity of the home cell. The increase/decrease in the capacity of each cell means to take all increases/decreases in the capacity of each cell caused by interference, which is generated by UEs allocated according to bands, into consideration. In an embodiment, the allocation-rate update unit 204 increases a UE resource allocation rate to maximize the overall network capacity by taking all the capacities of the home cell and neighbor cells into consideration.

In block 308, the power control unit 206 controls the uplink transmission power of the UE through the use of the capacity sensitivities of the home cell and neighbor cells. Increasing the transmission power of a UE increases the capacity of the home cell, but generates a trade-off effect that causes interference to neighbor cells. Consequently, in some situations, a capacity decrease larger than a capacity increase of the home cell may be caused in a neighbor cell. Therefore, the power control unit 206 increases the power of each UE located in the home cell only when the capacity increase of the home cell caused by the increase of the transmission power of the UE is larger than the capacity decrease of a neighbor cell thereby. In contrast, when the capacity increase of the home cell caused by an increase of the transmission power of a UE is smaller than the capacity decrease of a neighbor cell thereby, the power control unit 206 may control decrease the transmission power of the UE.

In FIG. 3, a process indicated by reference numeral 320 is performed every frame, and includes block 312.

In block 312, when the mod(frame, Ticic) does not have a value of zero (i.e. when the number of the current frame is not a multiple of Ticic), the scheduling unit 208 of the base station apparatus performs a UE scheduling. That is, the scheduling unit 208 may perform a scheduling operation for at least one UE located in the home cell based on at least one of the capacity sensitivity of the home cell, the capacity sensitivity of the neighbor cell, the resource allocation rate determined by the allocation-rate update unit 204, and/or the transmission power controlled by the power control unit 206.

It should be noted that the operational flowchart illustrated in FIG. 3 is not intended to limit the scope of the present invention. That is, blocks 300 to 312 in the process only illustrate the operations performed in the base station apparatus in an embodiment. However, other embodiments of the present invention may not require blocks 300 to 312 or perform blocks 300 to 312 in a specific sequence in order to implement the present invention.

A process of calculating the capacity sensitivity of a home cell to interference by the capacity sensitivity calculation unit 200 will now be described in detail.

When the index of a home cell is k, the capacity sensitivity $D_j^{(k)}$ of the home cell to interference in a $j^{th}$ band may be expressed as follows.

$$D_j^{(k)} = \sum_{n \in \Omega_k} \frac{\partial U^{(k)}}{\partial I_j^{(k)}} \qquad \text{[Eqn. 1]}$$

In equation 1, $U^{(k)}$ denotes the capacity of a $k^{th}$ cell, and $I_j^{(k)}$ denotes the amount of interference in a $j^{th}$ band of the $k^{th}$ cell. In addition, $\Omega_k$ denotes an index set of UEs who belong to the $k^{th}$ cell. That is, Equation 1 represents a capacity change rate of the $k^{th}$ cell to interference in the $j^{th}$ band.

The call capacity (i.e. utility) $U^{(k)}$ may be defined in various manners. For example, the call capacity may be defined as the sum of transmission rates of UEs, or may be defined by taking proportional fairness between UEs into consideration as follows.

$$U^{(k)} = \Sigma_{n \in \Omega_k} \log(R_n) \qquad \text{[Eqn. 2]}$$

In Equation 2, $R_n$ denotes a transmission rate of an $n^{th}$ UE. While the call capacity may be defined in various manners in addition to the examples, the following description will be given based on Equation 2 as an example.

By using a chain rule, $D_j^{(k)}$ can be expressed as follows.

$$D_j^{(k)} = \sum_{n \in \Omega_k} \frac{\partial U^{(k)}}{\partial R_n} \frac{\partial R_n}{\partial R_{n,j}} \frac{\partial R_{n,j}}{\partial SINR_{n,j}} \frac{\partial SINR_{n,j}}{\partial I_j^{(k)}} \qquad \text{[Eqn. 3]}$$

In Equation 3, $R_{n,j}$ and $SINR_{n,j}$ denote the transmission rate and SINR in a $j^{th}$ band for an $n^{th}$ uE. $R_n$, $R_{n,j}$, and $SINR_{n,j}$ are defined as follows.

$$R_n = \Sigma_{j=1}^{N_{RB}} \phi_{n,j} R_{n,j} \qquad \text{[Eqn. 4]}$$

$$R_{n,j} = B_{RB} \log_2(1 + \eta \max(SINR_{n,j}, SINR_{max})), \qquad \text{[Eqn. 5]}$$

wherein $\eta$ and $SINR_{max}$ are cons tan ts $$SINR_{n,j} = \frac{G_n^{(k)} P_n}{NI_j^{(k)}} \qquad \text{[Eqn. 6]}$$

Here, $N_{RB}$ denotes the number of resource blocks, i.e. the number of frequency, bands, wherein each frequency band is configured by a plurality of OFDM subcarriers and is the minimum unit of scheduling. That is, $N_{RB}$ number of frequency bands constitutes the overall system bandwidth.

$NI_j^{(k)}$ denotes sum of noise and interference signal power in an $j^{th}$ band of a $k^{th}$ cell, wherein, when noise power per band is $N_0$, $NI_j^{(k)}$ is expressed as $NI_j^{(k)} = N_0 + I_j^{(k)}$.

$B_{RB}$ denotes the bandwidth of each band, such that $N_{RB} B_{RB}$ represents a system bandwidth.

$\phi_{n,j}$ denotes a frequency resource allocation rate for an $n^{th}$ UE in a $j^{th}$ band, and has a value between 0 and 1. A method of calculating $\phi_{n,j}$ will be described later with description about the operation of the allocation-rate update unit 204.

In addition, $P_n$ denotes transmission power per band of UE n, and $G_n^{(l)}$ denotes a long-term channel gain between UE n and an $l^{th}$ cell, and represents a reciprocal of a path loss between UE n and the $l^{th}$ cell. Hence, the amount of interference between UE n and the $l^{th}$ cell may be expressed as $I_j^l = \phi_{n,j} G_n^{(l)} P_n$.

Using the equations and defines, the capacity sensitivity $D_j^{(k)}$ of a home cell per unit interference is expressed as follows.

$$D_j^{(k)} = -\sum_{n \in \Omega_k} \left( \frac{1}{R_n} \phi_{n,j} B_{RB} \frac{\eta \log_2 e 1_{SINR_{n,j} < SINR\ max}}{(1 + \eta SINR_{n,j})} \frac{G_n^{(k)} P_n}{(NI_j^{(k)})^2} \right) \quad [\text{Eqn. 7}]$$

In Equation 7, $1_{x<y}$ is defined as follows.

$$1_{x,y} \begin{cases} 1, & x < y \\ 0, & \text{otherwise} \end{cases} \quad [\text{Eqn. 8}]$$

Information on capacity sensitivity of the home cell, calculated by the capacity sensitivity calculation unit 200, as described above, is transmitted through the transmission/reception unit 202 to each neighbor cell for power control and allocation control of the neighbor cell. In addition, the capacity sensitivity calculation unit 200 receives capacity sensitivity of the neighbor cell from the neighbor cell through the transmission/reception unit 202. The capacity sensitivity of the home cell and the capacity sensitivity of the neighbor cell are transferred to the allocation-rate update unit 204 and power control unit 206 for allocation rate update and power control.

A process of updating, by the allocation-rate update unit 204, a resource allocation rate for a UE will now be described in detail.

The allocation-rate update unit 204 determines whether to increase or decrease the allocation rate $\phi_{n,j}$ of the $j^{th}$ band for UE n. Specifically, the allocation-rate update unit 204 selects a UE, which maximizes a network capacity when the allocation rate for the UE increases, increases the allocation rate for the selected UE, and decreases the allocation rates for the other UEs. To this end, a change rate of a network capacity to an allocation rate is calculated as Equation 9 below.

$$\frac{\partial U}{\partial \phi_{n,j}} = \frac{\partial U^{(k)}}{\partial \phi_{n,j}} + \sum_{l=1, \neq k}^{N_{cell}} \frac{\partial U^{(l)}}{\partial \phi_{n,j}} \quad [\text{Eqn. 9}]$$

That is, according to an embodiment of the present invention, a resource allocation rate update is performed by taking not only a capacity increment $$\frac{\partial U^{(k)}}{\partial \phi_{n,j}}$$

of a home cell but also a capacity increment $$\frac{\partial U^{(l)}}{\partial \phi_{n,j}}$$

of a neighbor cell into consideration, such that the allocation rates for UEs are updated to maximize the sum of the capacity increment of the home cell and the capacity increment of the neighbor cell.

Here, $$\frac{\partial U^{(k)}}{\partial \phi_{n,j}}$$

denotes a capacity increment of a home cell (i.e. $k^{th}$ cell) in which UE n is allocated in a $j^{th}$ band, wherein, when $U^{(k)} = \sum_{n \in \Omega_k} \log(R_n)$ and $R_n = \sum_{j=1}^{N_{RB}} \phi_{n,j} R_{n,j}$ are used $$\frac{\partial U^{(k)}}{\partial \phi_{n,j}} = \frac{R_{n,j}}{R_n}$$

can be obtained.

In addition, when a chain rule is used, the capacity increment $$\frac{\partial U^{(l)}}{\partial \phi_{n,j}}$$

of a neighbor cell (i.e. $l^{th}$ cell) may be expressed as $$\frac{\partial U^{(l)}}{\partial \phi_{n,j}} = \frac{\partial U^{(l)}}{\partial I_j^{(l)}} \frac{\partial I_j^{(l)}}{\partial \phi_{n,j}}$$

Optionally, when it is determined whether to increase or to decrease the capacity, one neighbor cell (rather than all neighbor cells) that exerts the amount of interference equal to or greater than a threshold value to the home cell may be taken into consideration, thereby reducing the amount of calculation.

$$\frac{\partial U^{(l)}}{\partial I_j^{(l)}}$$

is a value corresponding to a capacity sensitivity $D_j^{(l)}$ received from a neighbor cell, and $$\frac{\partial I_j^{(l)}}{\partial \phi_{n,j}} = G_n^{(l)} P_n$$

can be obtained from $I_{k,j}^{\ j} = \phi_{n,j} G_n^{(l)} P_n$. That is, $$\frac{\partial U}{\partial \phi_{n,j}}$$

is calculated as follows.

$$\frac{\partial U}{\partial \phi_{n,j}} = \frac{R_{n,j}}{R_n} + \sum_{l \neq k} D_j^{(l)} G_n^{(l)} P_n \quad [\text{Eqn. 10}]$$

With $$\frac{\partial U}{\partial \phi_{n,j}}$$

calculated as above, a UE $n^*_j$ which is to be allocated a $j^{th}$ band, i.e. for which an allocation rate of the $j^{th}$ band is to increase, is selected using Equation 11 below.

$$n_j^* = \arg\max_{n \in \Omega_k} \left\{ \frac{\partial U}{\partial \phi_{n,j}} \right\} \quad \text{[Eqn. 11]}$$

Then, allocation rates for a selected UE and a non-selected UE are updated as follows.

$$\phi_{n,j} = \begin{cases} (1-\beta)\phi_{n,j} + \beta, & \text{if } n = n_j^* \\ (1-\beta)\phi_{n,j}, & \text{otherwise} \end{cases} \quad (12)$$

In Equation 12, $\beta$ is a weighting factor representing a degree of an allocation rate to be changed, wherein $0<\beta\leq 1$.

When the $\phi_{n,j}$ is updated, besides the aforementioned method of changing the allocation rate with a weighing factor, a method of normalizing the number of bands actually allocated to UE n in a scheduling process during a past Ticic period based on the total number of allocation bands and then calculating an allocation rate may be used. Here, normalizing and calculating an allocation rate means increasing the number of bands to allocate by taking the number of bands actually allocated to UE n in a scheduling process during a past Ticic period into consideration, and allocating bands such that a sum of an allocation rate for UE n and allocation rates of UEs, except for UE n, can be one.

A process of controlling the transmission power of the UE by the power control unit 206 will now be described.

The power control unit 206 determines whether to increase or to decrease the power of each UE, using capacity sensitivity $D_j^{(l)}$ received from a neighbor cell. That is, using a capacity increment $$\frac{\partial U^{(k)}}{\partial P_n}$$

of a home cell and capacity decrements $$\sum_{l=1, \neq k}^{N_{cell}} \frac{\partial U^{(l)}}{\partial P_n}$$

of neighbor cells based on power increase, power control for each UE n is performed as follows.

$$P_n = \begin{cases} \Delta P_n, & \text{if } \frac{\partial U^{(k)}}{\partial P_n} + \sum_{l=1, \neq k}^{N_{cell}} \frac{\partial U^{(l)}}{\partial P_n} > 0 \\ \frac{1}{\Delta} P_n, & \text{otherwise} \end{cases} \quad \text{[Eqn. 13]}$$

In Equation 13, $\Delta$ is a unit of power control and is a constant value. That is, when the capacity increment of a home cell is larger than the capacity decrement of neighbor cells, the power control unit 206 increases power for UE n located in the home cell, and when the capacity increment of a home cell is smaller than the capacity decrement of neighbor cells, the power control unit 206 increases power for the UE.

With a chain rule, the capacity increment $$\frac{\partial U^{(k)}}{\partial P_n}$$

of a home cell is expressed as follows.

$$\frac{\partial U^{(k)}}{\partial P_n} = \frac{\partial U^{(k)}}{\partial R_n} \sum_{j=1}^{N_{RB}} \left( \frac{\partial R_n}{\partial R_{n,j}} \frac{\partial R_{n,j}}{\partial SINR_{n,j}} \frac{\partial SINR_{n,j}}{\partial P_n} \right) \quad \text{[Eqn. 14]}$$

When it is assumed that $U^{(k)} = \Sigma_{n \in \Omega_k} \log(R_n)$, Equation 14 is calculated as follows.

$$\frac{\partial U^{(k)}}{\partial P_n} = \sum_{j=1}^{N_{RB}} \left( \frac{B_{RB} \phi_{n,j} G_n^{(k)}}{R_n N I_j^{(k)}} \frac{\eta \log_2 e \mathbf{1}_{SINR_{n,j}<SINR\_max}}{(1+\eta SINR_{n,j})} \right) \quad \text{[Eqn. 15]}$$

Also, with a chain rule, the capacity increment $$\frac{\partial U^{(l)}}{\partial P_n}$$

of a neighbor cell l is expressed as follows.

$$\frac{\partial U^{(l)}}{\partial P_n} = \sum_{j=1}^{N_{RB}} \left( \frac{\partial U^{(l)}}{\partial I_j^{(l)}} \frac{\partial I_{k,l}^j}{\partial P_n} \right) \quad \text{[Eqn. 16]}$$

In Equation 16, $$\frac{\partial U^{(l)}}{\partial I_j^{(l)}}$$

is a value corresponding to a capacity sensitivity $D_j^{(l)}$ from a neighbor cell, and $$\frac{\partial I_j^{(l)}}{\partial P_n} = \phi_{n,j} G_n^{(l)}$$

can be obtained from $I_j^{(l)} = \phi_{n,j} G_n^{(l)} P_n$. Therefore, $$\frac{\partial U^{(l)}}{\partial P_n}$$

is calculated as follows.

$$\frac{\partial U^{(l)}}{\partial P_n} = \sum_{j=1}^{N_{RB}} \left( D_j^{(l)} \phi_{n,j} G_n^{(l)} \right) \quad \text{[Eqn. 17]}$$

Also, in order to limit inter-cell Interference of Thermal (IoT) to a predetermined level and to secure a predetermined level of the capacity of a UE located at a cell boundary when enhancing the power of the UE, Equation 13 may be modified and applied. That is, by multiplying the capacity increment $$\frac{\partial U^{(k)}}{\partial P_n}$$

of a home cell by a constant value $C_{Min}$ to secure the minimum capacity, and multiplying the capacity increment $$\frac{\partial U^{(l)}}{\partial P_n}$$

of a neighbor cell by a constant value $C_{IoT}$ to take IoT into consideration, the following equation may be applied.

$$P_n = \begin{cases} \Delta P_n, & \text{if } c_{Min}\frac{\partial U^{(k)}}{\partial P_n} + \sum_{l=1,\neq k}^{N_{cell}} c_{IoT}\frac{\partial U^{(l)}}{\partial P_n} > 0 \\ \frac{1}{\Delta}P_n, & \text{otherwise} \end{cases} \quad [\text{Eqn. 18}]$$

That is, when IoT of a neighbor cell is large, $C_{IOT}$ is set to a large value, such that it is possible to cause the power of UEs to be lowered until the IoT corresponds to a target value. Also, when an allocation rate of a low Modulation and Coding Scheme (MCS) for UEs in a home cell is equal to or greater than a predetermined value, $C_{Min}$ is set to a large value such that it is possible to cause the capacities of the UEs located at the boundary of the home cell to increase.

The above description has been given on the operations performed by the capacity sensitivity calculation unit 200, transmission/reception unit 202, allocation-rate update unit 204, and power control unit 206 every Ticic period (i.e. every long term). The operation performed by the scheduling unit 208 every frame (i.e. every short term) will now be described.

With $$\frac{\partial U^{(l)}}{\partial \phi_{n,j}}$$

obtained in the process of updating the allocation rate for the UE, and transmission power of the UE set in the power control process, the scheduling unit 208 calculates a scheduling metric of a $j^{th}$ band for UE n as follows.

$$M_{n,j}^{ICIC} = M_{n,j}^{PF} + \sum_{l=1,\neq k}^{N_{cell}} \frac{\partial U^{(l)}}{\partial \phi_{n,j}} \quad [\text{Eqn. 19}]$$

That is, the scheduling unit 208 performs a UE scheduling, using a scheduling metric which is created without taking cell capacities (or capacity sensitivities) of neighbor cells into consideration and change rates of the neighbor cells' network capacities to the allocation rate for the UE.

Here, $P_{n,j}^{PF}$ denotes an existing scheduling metric in a $j^{th}$ band for UE n which is created without taking the capacity of a neighbor cell into consideration. When a proportional-fairness (PF) scheduling is used, $$M_{n,j}^{PF} = \frac{T_{n,j}}{T_n}.$$

Here, $T_{n,j}$ denotes an instantaneous data rate in a $j^{th}$ band for UE n, $T_n$ denotes an average value of data rates actually allocated to UE n by the scheduling unit 208, and $N_{cell}$ denotes the number of neighbor cells that have received a capacity sensitivity. The scheduling unit 208 performs a scheduling by allocating a UE maximizing $M_{n,j}^{ICIC}$ to a $j^{th}$ band.

FIG. 4 illustrates information exchange between cells for Inter-Cell Interference Coordination (ICIC) when there is one neighbor cell according to an embodiment of the present invention.

At every Ticic period, a base station 102 of a home cell 100 calculates and transmits capacity sensitivities $D_1^{(1)}, \ldots, D_{N_{RB}}^{(1)}$ to a base station 112 of a neighbor cell 110 (see reference numeral 400), and receives capacity sensitivities $D_1^{(2)}, \ldots, D_{N_{RB}}^{(2)}$ calculated by the neighbor cell 110 from the neighbor cell 110 (see reference numeral 402).

As described above, capacity sensitivity information of a neighbor cell is used for scheduling of a home cell such that it is possible to achieve UE scheduling to maximize the capacity of the overall network. Also, a base station of a home cell periodically receives capacity sensitivity information of a neighbor cell and uses the received capacity sensitivity information for interference coordination, such that the base station can adaptively perform a UE scheduling to a change in distribution of UEs, which occurs every hour in an embodiment. In addition, because the capacity sensitivity information of the neighbor cell is transmitted/received in a long term (e.g. 100 msec) that is longer than a scheduling period, it is possible to minimize an increase of an overhead due to the transmission of the capacity sensitivity information of the neighbor cell.

The aforementioned operations may be implemented in such a manner that a component unit in a base station includes a memory device which stores corresponding program codes. That is, the aforementioned operation of each component in a base station may be performed in such a manner that a processor or a central processing unit (CPU) reads and executes the program codes stored in the memory device.

According to the present invention, it is possible to achieve power and allocation control to maximize the capacity of the overall network including neighbor cells and increase the system capacity in a cellular system in which inter-cell interference is large. Specifically, in an environment in which the distance between cells is short, and thus interference by neighbor cells is large, a high performance gain can be obtained.

Because information on a change in the capacity of each cell is shared by periods, it is possible to perform a UE scheduling adaptively in real time to a changing distribution of UEs.

In addition, an inter-cell information transmission overhead for capacity change information of each cell can be minimized.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) scheduling method performed by a base station in a cellular uplink communication system, the method comprising:
    calculating a home cell's capacity sensitivity, the home cell's capacity sensitivity being a capacity change rate of the home cell to interference in a predetermined band of the home cell;
    collecting at least one neighbor cell's capacity sensitivity, the neighbor cell's capacity sensitivity being a capacity change rate of the at least one neighbor cell to unit interference in a predetermined band of the neighbor cell; and
    scheduling at least one UE located in the home cell based on the home cell's capacity sensitivity and the at least one neighbor cell's capacity sensitivity.

2. The method of claim 1, further comprising:
    determining a resource allocation rate for the UE based on the home cell's capacity sensitivity and the at least one neighbor cell's capacity sensitivity; and
    controlling an uplink transmission power of the UE based on the home cell's capacity sensitivity and the at least one neighbor cell's capacity sensitivity.

3. The method of claim 2, wherein the resource allocation rate and the uplink transmission power are used in scheduling the UE located in the home cell.

4. The method of claim 3, wherein the resource allocation rate is determined to maximize a sum of a capacity increment of the home cell and a capacity increment of the at least one neighbor cell which result from a change of the resource allocation rate.

5. The method OF claim 3, wherein controlling the uplink transmission power of the UE based on the home cell's capacity sensitivity and the at least one neighbor cell's capacity sensitivity comprises:
    increasing the uplink transmission power of the UE when a capacity increment of the home cell caused by an increase of the uplink transmission power of the UE is larger than a capacity increment of the at least one neighbor cell caused by the increase of the uplink transmission power of the UE.

6. The method of claim 5, wherein a capacity decrement of the at least one neighbor cell is weighted by a weighting factor based on an Interference of Thermal (IoT).

7. The method of claim 5, wherein the capacity increment of the home cell is weighted by a weighting factor based on a minimum capacity required by the UE.

8. The method of claim 1, further comprising transmitting information on the home cell's capacity sensitivity to the at least one neighbor cell.

9. The method of claim 1, wherein collecting at least one neighbor cell's capacity sensitivity comprises collecting information on the at least one neighbor cell's capacity sensitivity which applies an intensity of interference equal to or greater than a threshold value to the home cell.

10. The method of claim 3, wherein scheduling at least one UE located in the home cell based on the home cell's capacity sensitivity and the at least one neighbor cell's capacity sensitivity comprises using a first scheduling metric determined as a sum of a second scheduling metric without taking the at least one neighbor cell's capacity into consideration and a change rate of the at least one neighbor cell's capacity to the resource allocation rate.

11. The method of claim 10, wherein the first scheduling metric is determined by the following equation:

$$M_{n,j}^{ICIC} = M_{n,j}^{PF} + \sum_{l=1, \neq k}^{N_{cell}} \frac{\partial U^{(l)}}{\partial \phi_{n,j}}$$

wherein $M_{n,j}^{PF}$ denotes a scheduling metric in a $j^{th}$ band for a UE n which is created without taking a capacity of a neighbor cell into consideration, $$M_{n,j}^{PF} = \frac{T_{n,j}}{T_n},$$

$T_{n,j}$ denotes an instantaneous data rate in a $j^{th}$ band for UE n, $T_n$ denotes an average value of data rates actually allocated to the UE n by a scheduling unit, $N_{cell}$ denotes a number of neighbor cells that have received a capacity sensitivity, k denotes an index of the home cell, and $$\frac{\partial U^{(l)}}{\partial \phi_{n,j}}$$

denotes a capacity change rate to an allocation rate change in a $j^{th}$ band for UE n in an $l^{th}$ neighbor cell.

12. A base station apparatus for scheduling a user equipment (UE) in a cellular uplink communication system, the base station apparatus comprising:
    a capacity sensitivity calculation unit comprising one or more processors configured to calculate a home cell's capacity sensitivity, the home cell's capacity sensitivity being a capacity change rate of the home cell to interference in a predetermined band of the home cell;
    a communication unit configured to collect at least one neighbor cell's capacity sensitivity, the neighbor cell's capacity sensitivity being a capacity change rate of the at least one neighboring cell to interference in a predetermined band of the neighbor cell; and
    a scheduling unit configured to schedule at least one UE located in the home cell based on the home cell's capacity sensitivity and the collected at least one neighbor cell's capacity sensitivity.

13. The base station apparatus of claim 12, further comprising:
    an allocation-rate update unit configured to determine a resource allocation rate for the UE based on the home cell's capacity sensitivity and the at least one neighbor cell's capacity sensitivity; and
    a power control unit configured to control an uplink transmission power of the UE based on the home cell's capacity sensitivity and the at least one neighbor cell's capacity sensitivity.

14. The base station apparatus of claim 13, wherein the scheduling unit is configured to further use the resource allocation rate and the uplink transmission power in scheduling the UE located in the home cell.

15. The base station apparatus of claim 14, wherein the allocation-rate update unit is configured to determine the resource allocation rate to maximize a sum of a capacity increment of the home cell and a capacity increment of the at least one neighbor cell which result from a change of the resource allocation rate.

16. The base station apparatus of claim 14, wherein the power control unit is configured to increase the uplink transmission power of the UE when a capacity increment of the home cell caused by an increase of the uplink transmission power of the UE is larger than a capacity increment of the at least one neighbor cell caused by the increase of the uplink transmission power of the UE.

17. The base station apparatus of claim 16, wherein a capacity decrement of the at least one neighbor cell is weighted by a weighting factor based on an Interference of Thermal (IoT).

18. The base station apparatus of claim 16, wherein the capacity increment of the home cell is weighted by a weighting factor based on a minimum capacity required by the UE.

19. The base station apparatus of claim 12, wherein the communication unit is configured to transmit information on the home cell's capacity sensitivity to the at least one neighbor cell.

20. The base station apparatus of claim 12, wherein the capacity sensitivity calculation unit is configured to collect information on the at least one neighbor cell's capacity sensitivity which applies an intensity of interference equal to or greater than a threshold value to the home cell.

21. The base station apparatus of claim 14, wherein the scheduling unit is configured to use a first scheduling metric determined as a sum of a second scheduling metric without taking the at least one neighbor cell's capacity into consideration and a change rate of the at least one neighbor cell's capacity to the resource allocation rate.

22. The base station apparatus of claim 21, wherein the first scheduling metric is expressed as following equation:

$$M_{n,j}^{ICIC} = M_{n,j}^{PF} + \sum_{l=1, \neq k}^{N_{cell}} \frac{\partial U^{(l)}}{\partial \phi_{n,j}}$$

wherein $M_{n,j}^{PF}$ denotes a scheduling metric in a $j^{th}$ band for UE n which is created without taking a capacity of a neighbor cell into consideration, $$M_{n,j}^{PF} = \frac{T_{n,j}}{T_n},$$

$T_{n,j}$ denotes an instantaneous data rate in a $j^{th}$ band for UE n, $T_n$ denotes an average value of data rates actually allocated to UE n by a scheduling unit, $N_{cell}$ denotes a number of neighbor cells which have received a capacity sensitivity, k denotes an index of the home cell, and $$\frac{\partial U^{(l)}}{\partial \phi_{n,j}}$$

denotes a capacity change rate to an allocation rate change in a $j^{th}$ band for UE n in an $l^{th}$ neighbor cell.

* * * * *